F. WILLSON.
GOGGLES.
APPLICATION FILED NOV. 14, 1919.
1,339,731. Patented May 11, 1920.
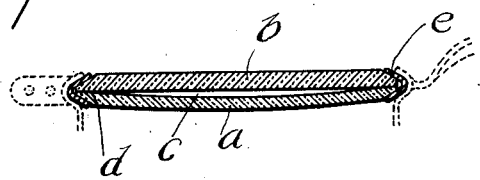
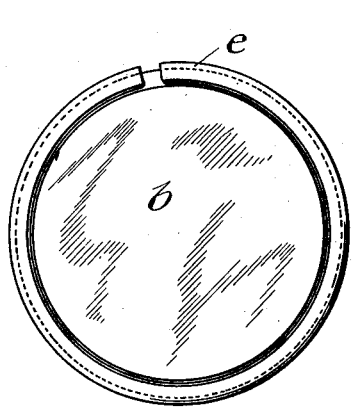 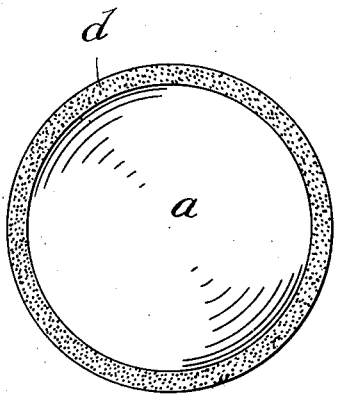
Frederick Willson,
INVENTOR
by
Attorneys

UNITED STATES PATENT OFFICE.

FREDERICK WILLSON, OF READING, PENNSYLVANIA, ASSIGNOR TO T. A. WILLSON & CO., INC., OF READING, PENNSYLVANIA, A CORPORATION OF PENNSYLVANIA.

GOGGLES.

1,339,731.

Specification of Letters Patent. Patented May 11, 1920.

Application filed November 14, 1919. Serial No. 337,985.

*To all whom it may concern:*

Be it known that I, FREDERICK WILLSON, a citizen of the United States, residing at Reading, in the county of Berks and State of Pennsylvania, have invented certain new and useful Improvements in Goggles, of which the following is a specification.

My invention relates to goggles, and particularly to an improved composite glass or eye-covering structure therefor comprising separable protection and guard disks rigidly combined for unitary application to the framing as fully described in connection with the accompanying drawing and clearly defined in the subjoined claim.

Figure 1 is a cross-sectional view showing the composite structure of the device; the engaging portion of a framing to which it is unitarily applicable being indicated in dotted lines.

Fig. 2 is a plan view of the complete device.

Fig. 3 is an inner-face view of the dished disk element indicating the annular contact provided for the opposing element.

In goggles adapted for use in welding service or the like, it has been recognized that the eye-covering which primarily provides protection from the blinding glare, should be safe-guarded against injury by contacting material. The objects of my invention are to provide for advantageously securing such double protection and for conveniently maintaining it, and to accomplish this with ordinary materials and with ease of handling in assembling and renewals.

To this end my invention consists in separately but rigidly combining in a single "glass" as it may be conveniently termed, two separately formed eye-covering disks, one of which as $a$, is more particularly adapted for protecting the eye from light and heat rays, and the other $b$, for effectively guarding the disk $a$, as hereinafter fully stated.

The eye-protecting disk $a$, is preferably of dished or concavo-convex form as indicated, and the guard disk $b$, flat, so that when arranged opposedly as indicated an air space $c$, is formed between them. To provide for securing a close and strong combination of the two disks I grind to a flat plane the outer portion of the concaved face of the disk $a$, so as to form an annular contact surface $d$, for the opposed disk $b$, and when so placed I finally clamp them together so as to exclude all dirt between them and form a unitary structure, this being conveniently accomplished as indicated by means of a spring ring $e$, adapted to draw together and tightly inclose the oppositely beveled edges of the opposed disks.

This clamping ring $e$, of the unitary structure described, forms a frame-engaging edge therefor adapting it to be placed in or removed from a suitable framing as usual. When thus placed the outer guard disk $b$, forms a strong and effective barrier to contact of foreign material with the inner disk, and one which can be easily replaced if scratched or broken; and the seating of the space between the disks largely prevents clouding either by dirt or by condensation of moisture.

What I claim is:

In goggles, a unitary eye glass structure comprising separable eye-protecting and guard disks one of which is of concavo-convex form and has a marginal portion of its concave face ground to provide an annular seating for the opposed disk, and a clamping ring encircling the annularly contacting disks.

In testimony whereof I affix my signature.

FREDERICK WILLSON.